Oct. 14, 1969     P. SEGUIN     3,472,947

NONEXTENSIBLE MULTICONDUCTOR CABLE

Filed May 17, 1968     2 Sheets-Sheet 1

INVENTOR
PIERRE SEGUIN

BY *Sherman & Shalloway*

ATTORNEY

Oct. 14, 1969  P. SEGUIN  3,472,947
NONEXTENSIBLE MULTICONDUCTOR CABLE
Filed May 17, 1968  2 Sheets-Sheet 2
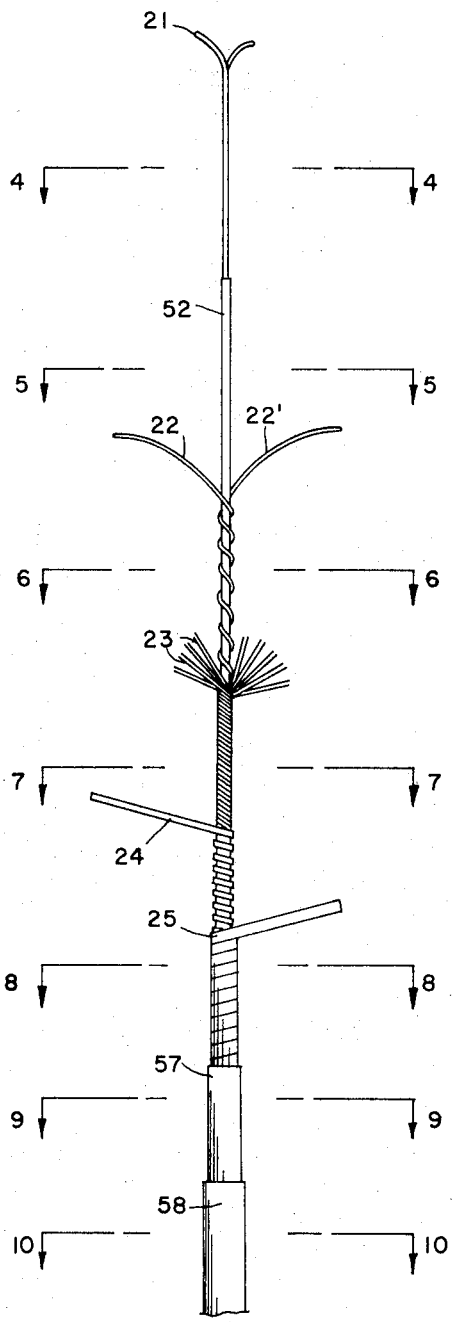
FIG. 3
FIG. 4
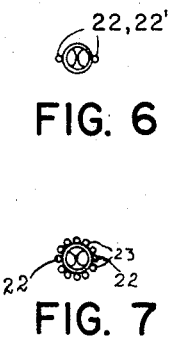
FIG. 5
FIG. 6
FIG. 7
FIG. 8
FIG. 9
FIG. 10
INVENTOR
PIERRE SEGUIN
BY *Sherman & Shalloway*
ATTORNEY

United States Patent Office 3,472,947
Patented Oct. 14, 1969

3,472,947
NONEXTENSIBLE MULTICONDUCTOR CABLE
Pierre Seguin, Chavanoz, France, assignor to Societe Moulinage et Retorderie de Chavanoz, Chavanoz, France, a corporation of France
Continuation-in-part of application Ser. No. 608,111, Jan. 9, 1967. This application May 17, 1968, Ser. No. 730,150
Claims priority, application France, May 19, 1967, 48,681
Int. Cl. H01b 7/28, 11/02
U.S. Cl. 174—113       6 Claims

ABSTRACT OF THE DISCLOSURE

A nonextensible multiconductor wire cable comprising a core of nonconductive yarns and at least two conductors in said core wherein the conductors are symmetrically arranged with respect to the longitudinal axis of said core. Said core comprising a first nonconductive element, two electrically conductive filaments and surrounding nonconductive elements which core is impregnated with a polymerizable composition and subsequently wrapped with oppositely disposed wrapping yarns. The sub-assembly is then coated with plastics comprising vinyl polymers or copolymers wherein the outermost coat is of a thermoplastic nature.

---

This application is a continuation-in-part of my prior application Ser. No. 608,111 filed Jan. 9, 1967.

This invention broadly relates to electrical cables. More specifically, it relates to such cables which contain a core comprising a plurality of electrically conductive elements and a plurality of nonconductive elements arranged in a predetermined configuration and covered with sheaths of plastic materials.

The cable according to the present invention provides a nonextensible conductor cable which has a high resistance to traction and friction, which is pliable and strong and which has low flammability. The invention also concerns an apparatus for producing the above-noted conductor cable.

The cables in accordance with the present invention are particularly adapted for use in missile control systems. More specifically, the cable is adapted to be used in a missile system which utilizes a cable attached to a ground control station at one end and attached to a moving missile at the other end. Such cables are conventionally stored on spools attached to the missile. In the missile control system, it is necessary to provide cables which are capable of transmitting signals or orders in the form of rectangular coordinates.

According to the present invention a cable is provided which is characterized by utilizing at least two electrically conductive metal wires or filaments which are held symmetrically oriented in a core of nonconductive filaments which core is then provided with a wound covering and subsequently with a plastic coating or coatings.

In missile control cables, the practice has been to attach one end of the cable to an appropriate receiving point in the missile and to mount a spool of the cable on the back of the missile with the free end being attached to a stationary ground point. Thus, when the missile is fired the cable remains attached and is unwound during the initial movement of the missile. This enables transmission of control orders through such a conductive cable.

The cables which have heretofore been used were found to present problems since the unwinding of the cable from the spool is not smooth and therefore, the cable is subjected to stresses which weaken and possibly break the cable prematurely. These stresses are understandably large since the missile may be moving at a speed in the range of 250 meters per second requiring a typical unwinding speed in the range of 40,000 r.p.m. Not only is there a danger of stressing the cable due to sudden jerks, but also the large speed involved causes frictional forces between the coils of the cable as it unwinds.

The forces due to stresses which have been encountered have been reduced by using a conical element known as a "convergent" which is placed in the path of travel of the wire as it unwinds. As the wire leaves a supply spool, it passes over the convergent and is unwound in the form of a balloon free from interference with the adjacent unwinding coils. This device can be visualized by analogy to the winding and spinning of a toy top wherein coils of a string unwind from the conical top. When unwinding, the coils have a much larger diameter than the original diameter presented when it was wound onto the top.

However, the use of a convergent is not always satisfactory since there are still stresses present due to the initial unwinding of the wire from the spool. And as the cable is unwound the efficiency of the convergent was found to be decreased.

An additional disadvantage in previously system results from the nature of the cables used. Conventional cables are covered with an outside coating of a plastic, for example, a silicone-containing resin. Due to the above-noted frictional and stress forces, the coating is in part mechanically abraded and removed as a powder and in part melted due to frictionally generated heat in the cable coils. Of course, the removal of the outer cable coating renders the cable less effective, but it also considerably increases the forces to be overcome by the unwinding cable.

One more problem inherent in existing cables and with those cables used in missile control systems is the tendency of a cable which is not correctly held on the spool to "lasso." The phenomenon referred to as a "lasso" is experienced whenever a strand is pulled from a spool. The spool is given an initial angular velocity and as the upper most coil leaves, it has a linear velocity which is lower than the angular velocity of the spool. Thus, the coil does not always leave the periphery of the spool and subsequently, unwound coils overlap and become entangled. When this entanglement occurs, the coils coming off the spool are slowed and the continuously moving missile eventually jerks the cable and pulls the whole tangled coil forward under great stress. Here there is a great possibility of breaking the cable. This lasso action can be reduced when a cable is used which is properly gripped on the spool and which is pliable but strong.

Accordingly, it is a primary object of this invention to provide a multiconductor cable having characteristics which will reduce the noted problems now encountered in using spooled cables to control missiles.

Another object is to produce a cable having high inherent strength, pliability, resistance to friction and low flammability and having a low time constant.

Another object is to produce the subject cable having a thermoplastic outer coat which renders the coils of a spooled cable adherent thus reducing the tendency of an unwinding cable to lasso.

Still another object is to provide a coating of the noted type which will not be removed by forces experienced during unwinding.

The nature of the invention will be better understood from the following description taken in connection with the accompanying drawings in which a specific embodiment has been set forth by way of non-limiting example.

FIGURE 3 shows a preferred form of conductor cable according to the present invention.

FIGURE 4 is a cross-sectional view of the cable of FIGURE 3 along the line 4—4.

FIGURE 5 is a cross-sectional view of the cable of FIGURE 3 along the line 5—5.

FIGURE 6 is a cross-sectional view of the cable of FIGURE 3 along the line 6—6.

FIGURE 7 is a cross-sectional view of the cable of FIGURE 3 along the line 7—7.

FIGURE 8 is a cross-sectional view of the cable of FIGURE 3 along the line 8—8.

FIGURE 9 is a cross-sectional view of the cable of FIGURE 3 along the line 9—9.

FIGURE 10 is a cross-sectional view of the cable of FIGURE 3 along the line 10—10.

In our copending application Ser. No. 608,111 filed Jan. 9, 1967, there is described a cable comprising a core of glass filaments, conductive wires symmetrically arranged with respect to the glass filaments and covered with a winding and plastic coatings.

Although conductors have been known which comprise a conductor wrapped with non-conductive strands and covered with plastic materials (see, for example U.S. Patent 2,390,039 and French Patent 1,354,961), these wires do not show properties such as are necessary for use in a missile control system. The cable of this invention may be distinguished since it utilizes a plurality of conductive wires arranged symmetrically with respect to nonconductive strands and covered with a thermoplastic outer coating wherein oppositely twisted wrapping yarns are applied between the core and the outer coating.

The electrical conductors suitable for use in the present cable may be of any suitable metal having any suitable size. Of course, the nature of the use intended for the cable will dictate the size and nature of the conductors. However, it has been found that conductors having a diameter of about 0.1 mm. and being made of copper are suitable.

The nonconductive filaments are indicated as 23 in the figures. These elements are preferably glass filaments, but may also comprise glass strands. A strand comprises a plurality of twisted filaments.

Figure 1:
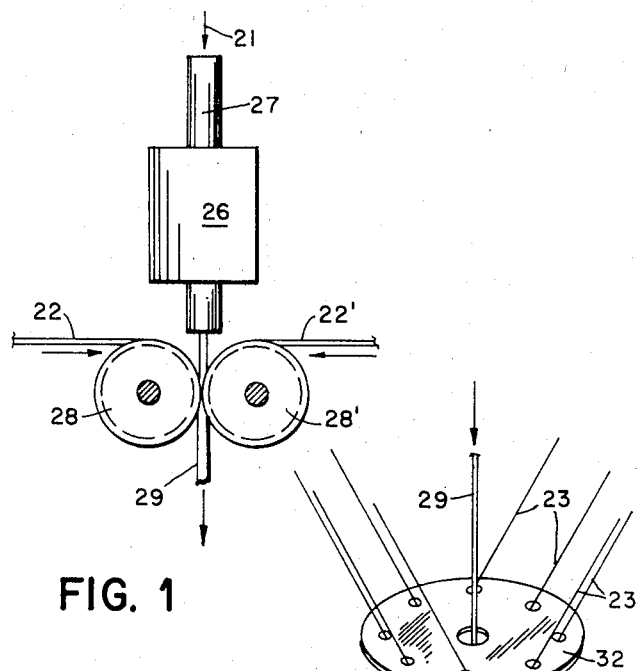
FIGURE 1 shows an apparatus for assembling the conductor wires of the present cable and FIGURE 2 shows diagrammatically an apparatus for assembling the non-conductive filaments and covering yarns on the cable core.
Figure 2:
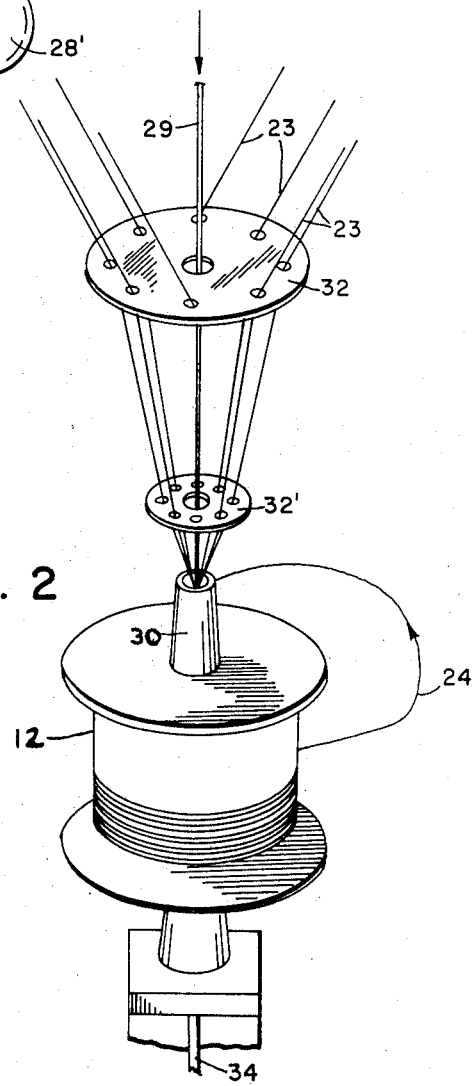

Reference is made to the apparatus shown in FIGURE 2 which may be used for wrapping nonconductive filaments 23 around the core 29. In this apparatus nonconductive filaments or strands 23 are unwound from spools (not shown). Conventionally, a reel of the nonconductive element is supplied and the nonconductive filaments pass over guides 32, 32′ while at the same time enameled conductive elements 22 and 22′ are unwound from spools by the apparatus of FIGURE 1. The conductive elements pass over guide pulleys 28, 28′ onto a core element comprising glass filament or strand 21. The filaments 21 and wires 22 and 22′ converge at guide pulleys 28, 28′ where they are united by means of an adhesive previously applied to core filament 21. Next this "core" 29 passes to the spindle 30 which carries a bobbin or spool 12, which supplies a covering or wrapping yarn 24. The spindle 30 is surrounded by a ring with a runner (not shown) in a conventional manner which serves to guide covering yarn 24 onto core 29 and filaments 23. The covering yarn 24 passes into the runner and is applied over the conductive and nonconductive arrangement as the assembly passes through the hollow spindle 30. This apparatus is conventionally used to apply a wrapping material to a stranded multifilament yarn. By passing through a second identical spindle a second wrapping yarn 25 (FIG. 3) may be applied with an opposite twist to yarn 24. The assembled cable with wrapping yarns passes over suitable guides and then through a coating bath. The assembled cable may be coated by conventional techniques, either by vertically passing through a hot melt or by immersion in a bath of a suitable vinyl polymer or copolymer. After the coating is applied, heat is applied to gel the coating, and the coating is cooled prior to each subsequent application of vinyl polymer or copolymer. The coatings 57 and 58 may be applied to the core and wrapping strand. Since the last applied layer must be adhesive in nature, it is conventional to apply a release wrapping used during storing to prevent adhesion of the cable. When the cable is to be used, the release wrap is removed and the cable wound on a missile by use of a spool. Here, adhesion of the turns is required for the reasons before noted.

In the invention, the electrical conductors are symmetrically arranged in such a manner that there is a small capacitance between said conductors. The exact arrangement will vary, of course, with the type of cable being produced, which in turn varies with the intended use of the cable. However, by symmetrically arranging the conductors and by separating them along their lengths, the capacitance between such conductors is eliminated, and the optimum point is determinable by one of ordinary skill in the art. In order to maintain the separation between the conductor wires, the insulating core yarn 21 is herein utilized. Core yarn 21 is of a non-conductive nature and may be the same as the nonconductive strands or filaments referred to as filaments 23. That is, it may be a filament or strand. The core yarn 21 is adhesively coated so that the conductors 22, 22′ are held in place. In this embodiment the conductors should be diametrically opposed relative to said core yarn. Although the conductors will be diametrically opposed, when a cross section is taken at any point along the length of the cable it is preferable to apply the conductors around the core yarn in a helical form. For example, the conductive elements are applied on the core 21 in the form of a helix, wherein the wrappings are offset by approximately a one-half pitch relationship. As noted before, the conductors are secured in place by adhesive applied to the yarn which adhesive may be any suitable material. In order to further maintain the arrangement, a plurality of nonconductive filaments or strands is arranged generally parallel to the core in the manner before described.

The core now composed of core yarn 21, conductors 22, 22′, and nonconductive elements 23 is wrapped with a wrapping yarn 24. The wrapping yarn is applied in an S twist of about 500 turns per meter and the cable is then given a slight S twist of about 1200 turns per meter. Additionally, a second wrapping yarn is then applied on top of the first wrapping yarn with an opposite Z twist of approximately 1200 turns per meter. Following these applications the vinyl polymer or copolymer coating or coatings may be applied as is described above. A typical example of a cable formed as shown in FIGURE 3 is as follows: a glass core yarn 21 is provided, comprising twisted glass filaments and an adhesive coat 52 is applied, next two copper conductors 22, 22′ are provided in a core arrangement, which is then covered by means of the apparatus of FIGURE 2 with nonconductive strands or filaments 23 applied parallel to the conductors and finally wrapping yarns 24, 25 are applied. The wrapping yarns are, for example, natural, synthetic, or artificial organic or inorganic material. The preferred yarn is a linear polycondensate, such as a polyamide or polyester. The second wrapping yarn is preferably one having a small filament count per strand. When applying the first plastic covering 57 it should be noted that this is intended to reduce abrasion on the conductors. Accordingly, it has been found that any thermoplastic material, but especially a copolymer of polyamides having a thickness of approximately 0.01 mm. thickness is desirable. The outer-most layer of plastic coating is a homogenous adhesive layer.

The wire conductors may have a diameter of approximately 0.07 mm., which are applied in opposed relation to a core yarn of glass filaments Nm. 22.5; and secured by means of an adhesive 52 with a neoprene base, thus, the conductors are secured to the core yarn 21. This assembly is covered with, for example, 9 glass filaments Nm. 90 arranged parallel to the core and a silicone oil polymerizing at ambient temperature and presenting a viscosity of 130 centipoises at 25° C. is applied to impregnate this assembly for imparting water resistance. The core thus obtained is then consolidated with a wrapping of a polyamide 66 (yarn 24) having the following characteristics: 70 denier, 34 strands per yarn applied in an S-twist of 500 turns per meter. This assembly is then subjected to an S-twist of 1200 turns per meter and is covered with a second wrapping yarn 25 having 150 denier, 100 filaments per yarn, and being applied with a Z-twist of 1200 turns per meter. This assembly is then coated with a thin layer 57 of 0.01 mm. of a copolymer obtained by copolymerizing caprolactam and hexamethylene-diamine adipate, which coating is deposited from an alcoholic solution. A second coating 58 comprising a copolymer of vinyl chloride and vinyl propionate in an ethyl acetate solution is applied and the solvent is evaporated by heat to dry and polymerize the coating. The cable thus obtained has a tensile strength of 10 kg., presents a total diameter of 0.43 mm., has a weight of 300 g. per km., a resistance of 5,000 ohms per km., and a capacity of 70 picofarads per meter between rectilinear conductors.

The cable is sufficiently fine, flexible, resistant, and strong to permit windings of several km. length. Such windings can be drawn at great speeds without objectionable stresses. This is due to the good gripping which is achieved between coils on a spool. The cable is of particular importance in combining mechanical properties and excellent electrical properties. Specifically, the wire is extremely strong, is non-extensible, and thereby eliminates internal friction and presents a slight capacity between conductors. All of these characteristics make it particularly suitable for use in equipping missiles.

Returning to the apparatus shown in FIGURES 1 and 2 such apparatus is suitable for forming the core of the subject cables. In these figures a core wire 21 coated with an adhesive passes through a tube 27 heated by a temperature-regulated surface 26. The core then passes between two grooved rollers 28 and 28', which calibrate and adhesively secure the conductors 22 and 22', holding them diametrically opposed to each other. The composite core 29 thus obtained then passes through a spindle 30 (see FIGURE 2). At the same time, other concentrically arranged glass filaments 23 are guided in a predetermined geometric distribution by perforated plates 32 and 32'. A covering yarn 24 made of polyamide or polyester passes through the top of the hollow spindle 30 and is wrapped around the assembly to produce the cable 34. Cable 34 is passed through a second spindle which applies a second wrapping yarn and through coating baths. The cable may be calibrated in a dye and subjected to heat to bake the plastic coats. If desired, the cable 34 may be coated with other intermediate layers of thermo-adhesive materials and/or the release wrap noted above.

While the above description has referred to a suitable apparatus for producing the cable and for alternative embodiments of the cable, it should be noted that the invention is not limited by the language or specific examples used herein, but rather is to be limited by the claims only. Specifically equivalent materials and obvious substitutions will at once become apparent to those skilled in the art, and substitutions are within the scope of the invention.

By sequential reference to FIGURES 4 through 10 the cable components may be seen. FIGURE 4 shows two glass nonconductive filaments which form a core yarn 21. FIGURE 5 shows the adhesive layer 52. FIGURE 6 shows the diametrically arranged conductors 22, 22' applied over the filaments or yarn 21. FIGURE 7 shows the nonconductive elements 23 applied parallel to conductors 22, 22'. FIGURE 8 shows the wrapping yarn 24 and 25 applied to the assembled core. FIGURE 9 shows the thin abrasion resistant plastic coating 57, and FIGURE 10 shows the outer adhesive thermoplastic vinyl containing coating 58.

Having described my invention in full, clear, and concise terms, what is to be protected by Letters Patent is defined in the following claims.

I claim:

1. A flexible, nonextensible, multiconductor cable comprising:
   a core comprising nonconductive elements and symmetrically arranged conductive elements,
   at least two wrapping yarns applied to said core having opposite twists, and
   at least two polymerized plastic coating layers applied over said wrapping yarns, at least the outer most coating formed from a vinyl-plastic composition.

2. The cable of claim 1, wherein said core is impregnated with a polymerizable silicone resin.

3. The cable of claim 1 wherein the wrapping yarns are composed of condensation polymers.

4. The cable of claim 1 wherein the condensation polymer is a polyamide.

5. The cable of claim 1 wherein a first plastic layer is applied comprising a copolymer of caprolactam and hexamethylene diamine adipate, in water alcohol composition.

6. The cable of claim 1 wherein the outermost plastic layer is a copolymer of vinyl chloride and vinyl propionate in solution in ethyl acetate.

References Cited

UNITED STATES PATENTS 2,581,212  1/1952  Spooner.
3,153,696  10/1964  Blanchard _____ 174—113

E. A. GOLDBERG, Primary Examiner

U.S. Cl. X.R.
174—120